US009995840B1

(12) United States Patent
Viens (10) Patent No.: US 9,995,840 B1
(45) Date of Patent: Jun. 12, 2018

(54) AZIMUTHAL MINOR AVERAGING IN A WELLBORE (71) Applicant: Nabors Drilling Technologies USA, Inc., Houston, TX (US)

(72) Inventor: Christopher Viens, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days. days.

(21) Appl. No.: 15/489,256

(22) Filed: Apr. 17, 2017

(51) Int. Cl.
*G01V 5/04* (2006.01)
*E21B 47/00* (2012.01)
*E21B 47/12* (2012.01)

(52) U.S. Cl.
CPC .......... *G01V 5/045* (2013.01); *E21B 47/0002* (2013.01); *E21B 47/12* (2013.01)

(58) Field of Classification Search
CPC ........ E21B 47/12; E21B 47/024; E21B 47/00; E21B 47/124; G01V 1/46; G01V 1/48; G01V 8/12
USPC .......................................................... 250/256
See application file for complete search history.

(56) References Cited

U.S. PATENT DOCUMENTS

| 2005/0056421 | A1* | 3/2005 | Homan | G01V 11/005 166/254.2 |
| 2005/0140373 | A1* | 6/2005 | Li | G01V 3/28 324/338 |
| 2005/0234647 | A1* | 10/2005 | Haugland | G01V 11/00 702/6 |
| 2006/0173627 | A1* | 8/2006 | Haugland | G01V 11/00 702/9 |
| 2006/0248735 | A1* | 11/2006 | Haugland | E21B 47/022 33/304 |
| 2007/0223822 | A1* | 9/2007 | Haugland | G01V 11/002 382/232 |
| 2009/0114807 | A1* | 5/2009 | Kirkwood | G01V 5/101 250/269.7 |
| 2009/0192711 | A1* | 7/2009 | Tang | E21B 47/12 702/6 |
| 2009/0276158 | A1* | 11/2009 | Kirkwood | G01V 5/101 702/8 |
| 2010/0206064 | A1* | 8/2010 | Estes | E21B 47/01 73/152.57 |
| 2011/0161009 | A1* | 6/2011 | Wang | G01V 1/48 702/9 |

(Continued)

Primary Examiner — Taeho Jo
(74) Attorney, Agent, or Firm — Haynes and Boone, LLP (57) ABSTRACT A drilling rig apparatus is disclosed for improving geosteering control by reducing the amount of bandwidth necessary to convey log data to the surface in real time. A bottom hole assembly receives measurement data from azimuthal measurement sensors. The BHA sorts the measurement data into appropriate bins in a radial plot. The BHA selects a hemisphere for transmission of the measurement data in those bins for the selected hemisphere, instead of transmitting the data for all bins in the plot. The BHA may average the data in the bins for the selected hemisphere with the data of the mirroring bins in the non-selected hemisphere. The BHA transmits the measurement data to a surface controller, which mirrors the data transmitted to the corresponding bins in the non-selected hemisphere to reconstitute the full set of data for the radial plot, which is used for image log generation, geosteering and other control functions.

20 Claims, 6 Drawing Sheets (56) References Cited

U.S. PATENT DOCUMENTS

| | | | |
|---|---|---|---|
| 2012/0197528 A1* | 8/2012 | Le | G01V 11/002 702/7 |
| 2013/0268200 A1* | 10/2013 | Nikitin | G01V 5/125 702/8 |
| 2014/0032116 A1* | 1/2014 | Guner | G01V 3/30 702/6 |
| 2014/0034822 A1* | 2/2014 | Evans | G01V 5/101 250/267 |
| 2014/0056101 A1* | 2/2014 | Vu | E21B 47/0005 367/35 |
| 2015/0177409 A1* | 6/2015 | Sofiienko | G01V 5/125 250/269.1 |
| 2016/0024908 A1* | 1/2016 | Wu | G01V 3/28 702/9 |
| 2016/0033669 A1* | 2/2016 | Bittar | E21B 47/024 324/339 |
| 2016/0109606 A1* | 4/2016 | Market | G01V 1/50 367/25 |
| 2016/0187528 A1* | 6/2016 | Sofiienko | G01V 5/125 250/269.1 |
| 2017/0176627 A1* | 6/2017 | Venkataramanan | G01V 3/32 |
| 2017/0350239 A1* | 12/2017 | Roberson | E21B 49/08 |

* cited by examiner

AZIMUTHAL MINOR AVERAGING IN A WELLBORE

TECHNICAL FIELD

The present disclosure is directed to systems, devices, and methods for improving geosteering control. More specifically, the present disclosure is directed to improving geosteering control by reducing the amount of bandwidth necessary to convey log data to the surface in real time.

BACKGROUND OF THE DISCLOSURE

Underground drilling involves drilling a wellbore through a formation deep in the Earth using a drill bit connected to a drill string. Azimuthal imaging is used to map sides of the wellbore. In the past, this was used in vertical wellbores using wireline approaches. Data collected from the wellbore was referenced to north, hence the phrase "azimuthal imaging," and the data was obtained after drilling was complete. In the geosteering, directional drilling approaches today, reference is no longer to north in non-vertical drill paths but to "up"—the side of the wellbore closest to the surface. However, these tools are still referred to as azimuthal measurement tools. Further, these tools may now be used in "logging while drilling" (LWD) scenarios to collect wellbore and formation characteristics during the drilling process.

There are many different types of detectors (i.e., sensors) that may be located at a bottom hole assembly and that may detect information regarding sides of the wellbore. The detectors collect data (e.g., detect incoming radiation with gamma ray sensors) and bin them into some number of selected sectors according to a radial plot. However, due to bandwidth constraints in transmissions to a surface controller, only a small amount of the measurement data is typically transmitted to the surface controller. For example, where a radial plot is divided into 16 or 8 equal "bins," typically only two or four sectors total are transmitted to the surface, for example only an up/down (2 sectors) or up/down/left/right (four sectors). But generally it is more beneficial to transmit data for an image (e.g., a gamma image) in as many sectors as possible so as to add finer granularity so that more features may be resolved for further use/interpretation.

The present disclosure is directed to systems, devices, and methods that overcome one or more of the shortcomings of the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Embodiments of the present disclosure include a drilling rig apparatus for improving geosteering control by reducing the amount of bandwidth necessary to convey log data to the surface in real time.

In some examples, a bottom hole assembly (BHA) includes a BHA controller that receives measurement data from multiple sensors, referred to generally herein as azimuthal measurement sensors (e.g., resistivity sensors, sonic sensors, density sensors, image sensors, magnetic resonance sensors, seismic sensors, gamma ray sensors, etc.). This measurement data may be collected during rotary or slide drilling operations (or both over time). The BHA controller sorts the measurement data into bins of a radial plot. In some examples, the radial plot may be divided into 16 bins, while in other examples it may be divided into 8 bins or 4 bins. The principles herein apply regardless the number of bins, but 16 bins will be used for example.

After sorting the measurement data according to bins, the BHA controller selects a hemisphere of the radial plot—either a left hemisphere or a right hemisphere separated by a vertical axis. This, again, is because the radial plot identifies the "top" of the plot as the "top" of the wellbore—that portion facing up in the wellbore. The measurement data from the bins in the selected hemisphere will be transmitted to a surface controller, instead of the measurement data from all of the bins (i.e., the bins in both hemispheres). In some embodiments, the measurement data for the bins of the selected hemisphere are transmitted without averaging. In other embodiments, the BHA controller averages the measurement data in the bins of the selected hemisphere with the measurement data in the mirroring bins of the non-selected hemisphere. Further, in some embodiments the measurement data (averaged or not) may be compressed before transmission.

The measurement data of the selected hemisphere is transmitted to the surface control system. At the surface control system, the measurement data of the selected hemisphere is decompressed if compression had been previously performed by the BHA controller. The measurement data for each bin of the selected hemisphere is mirrored to the corresponding bin in the un-selected hemisphere. Thereby the surface control system is able to reconstitute measurement data for all bins of a radial plot to generate image logs and use in steering the BHA during drilling (and/or re-geosteer a well or otherwise characterize formations in the wellbore).

Accordingly, embodiments of the present disclosure provide improvements to geosteering control by improving bandwidth usage in communications between a BHA controller and a surface control system. The improvement in bandwidth usage results at least by the reduction of data transmitted for the un-selected hemisphere. In some embodiments the reduction is around 50%, while in other embodiments it may be around 25% (e.g., where up/down/left/right is the basis for data transmission instead of 8 or 16 bins). However, though the bandwidth usage is reduced, many bins are still able to be transmitted to create better image logs (according to the particular granularity available from 8 or 16 bins, etc.). Further, if the measurement data of the bins that mirror each other around the radial plot are averaged, then this further adds the benefit of smoothing the data in a way that reduces the statistical noise that may be associated with the raw sensor measurements.

Figure 1:
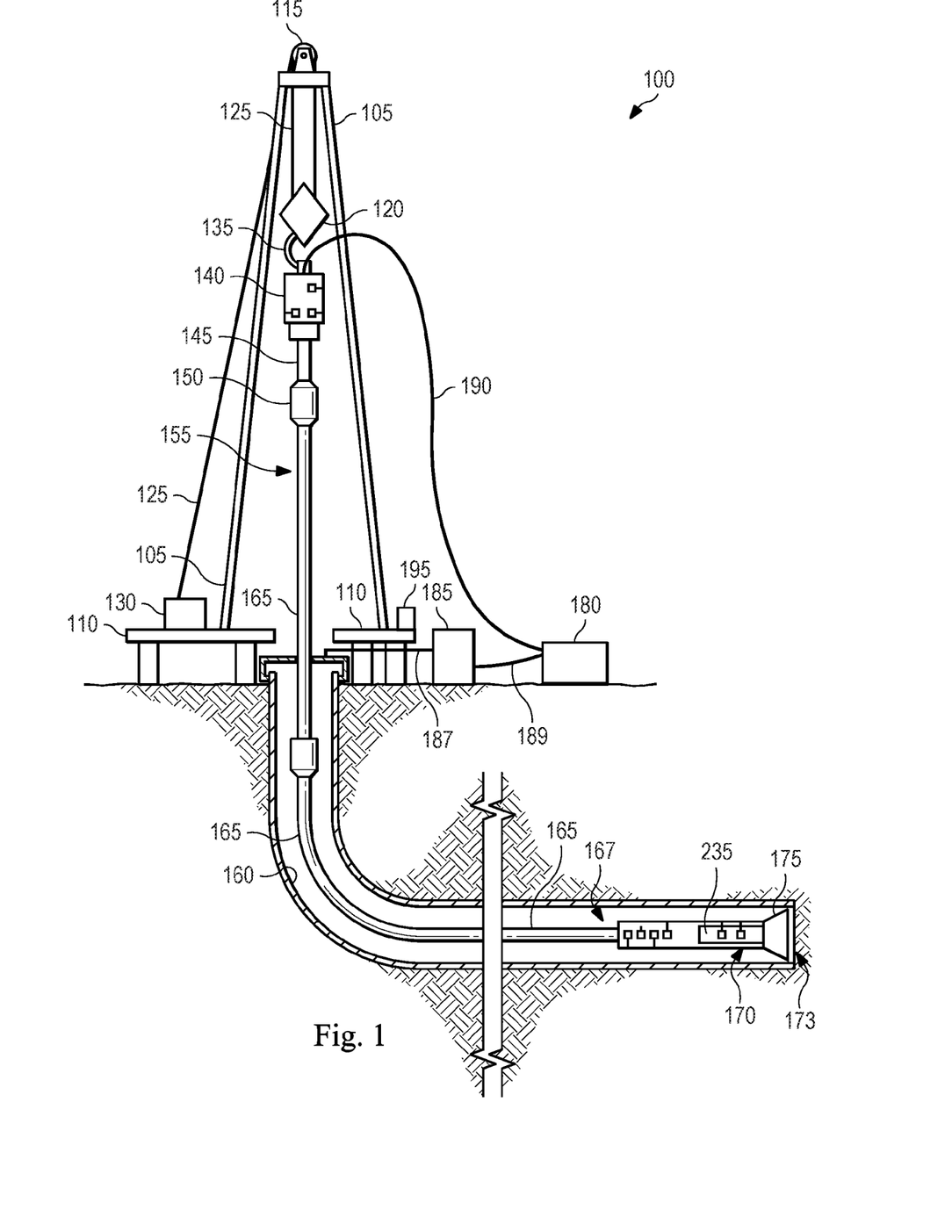
FIG. 1 is a schematic of an apparatus shown as an exemplary drilling rig according to one or more aspects of the present disclosure.

FIG. 1 is a schematic of a side view of an exemplary drilling rig 100 according to one or more aspects of the present disclosure. In some examples, the drilling rig 100 may form a part of a land-based, mobile drilling rig. However, one or more aspects of the present disclosure are applicable or readily adaptable to any type of drilling rig with supporting drilling elements, for example, the rig may include any of jack-up rigs, semisubmersibles, drill ships, coil tubing rigs, well service rigs adapted for drilling and/or re-entry operations, and casing drilling rigs, among others within the scope of the present disclosure.

The drilling rig 100 includes a mast 105 supporting lifting gear above a rig floor 110. The lifting gear may include a crown block 115 and a traveling block 120. The crown block 115 is coupled at or near the top of the mast 105, and the traveling block 120 hangs from the crown block 115 by a drilling line 125. One end of the drilling line 125 extends from the lifting gear to axial drive 130. In some implementations, axial drive 130 is a drawworks, which is configured to reel out and reel in the drilling line 125 to cause the traveling block 120 to be lowered and raised relative to the rig floor 110. The other end of the drilling line 125, known as a dead line anchor, is anchored to a fixed position, possibly near the axial drive 130 or elsewhere on the rig. Other types of hoisting/lowering mechanisms may be used as axial drive 130 (e.g., rack and pinion traveling blocks as just one example), though in the following reference will be made to axial drive 130 (also referred to simply as a drawworks herein) for ease of illustration.

A hook 135 is attached to the bottom of the traveling block 120. A drill string rotary device 140, of which a top drive is an example, is suspended from the hook 135. Reference will be made herein simply to top drive 140 for simplicity of discussion. A quill 145 extending from the top drive 140 is attached to a saver sub 150 configured according to embodiments of the present disclosure, which is attached to a drill string 155 suspended within a wellbore 160. The term "quill" as used herein is not limited to a component which directly extends from the top drive 140, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, for the sake of clarity and conciseness, these components may be collectively referred to herein as the "quill." It should be understood that other techniques for arranging a rig may not require a drilling line, and are included in the scope of this disclosure.

The drill string 155 includes interconnected sections of drill pipe 165, a bottom hole assembly (BHA) 170, and a drill bit 175 for drilling at bottom 173 of the wellbore 160. The BHA 170 may include stabilizers, drill collars, and/or measurement-while-drilling (MWD), LWD, and/or wireline conveyed instruments, among other components. The drill bit 175 is connected to the bottom of the BHA 170 or is otherwise attached to the drill string 155. In the exemplary embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

A mud pump system 180 receives the drilling fluid, or mud, from a mud tank assembly 185 and delivers the mud to the drill string 155 through a hose or other conduit 190, which may be fluidically and/or actually connected to the top drive 140. In some implementations, the mud may have a density of at least 9 pounds per gallon. As more mud is pushed through the drill string 155, the mud flows through the drill bit 175 and fills the annulus 167 that is formed between the drill string 155 and the inside of the wellbore 160, and is pushed to the surface. At the surface the mud tank assembly 185 recovers the mud from the annulus 167 via a conduit 187 and separates out the cuttings. The mud tank assembly 185 may include a boiler, a mud mixer, a mud elevator, and mud storage tanks. After cleaning the mud, the mud is transferred from the mud tank assembly 185 to the mud pump system 180 via a conduit 189 or plurality of conduits 189. When the circulation of the mud is no longer needed, the mud pump system 180 may be removed from the drill site and transferred to another drill site.

The drilling rig 100 also includes a control system 195 configured to control or assist in the control of one or more components of the drilling rig 100. For example, the control system 195 may be configured to transmit operational control signals to the drawworks 130, the top drive 140, the BHA 170 and/or the mud pump system 180. The control system 195 may be a stand-alone component installed somewhere on or near the drilling rig 100, e.g. near the mast 105 and/or other components of the drilling rig 100, or on the rig floor to name just a few examples. In some embodiments, the control system 195 is physically displaced at a location separate and apart from the drilling rig, such as in a trailer in communication with the rest of the drilling rig. As used herein, terms such as "drilling rig" or "drilling rig apparatus" may include the control system 195 whether located at or remote from the drilling rig 100.

According to embodiments of the present disclosure, a BHA controller 235 at the BHA 170 may include an interface to receive measurement data from one or more sensors e.g. that are configured to detect parameters relating to the drilling environment (e.g., while the drilling is occurring—in real time), the BHA 170 condition and orientation, and other information. For example, the BHA controller 235 may receive measurement data from multiple azimuthal measurement sensors, such as gamma ray sensors to name an example. The BHA controller 235 may sort the measurement data it receives from a given detector into the appropriate bins of a radial plot, based on where the sensors currently are in relation to the coordinates of the radial plot. In some embodiments, the radial plot may be divided into 8 bins spaced evenly about the radial plot, while in other embodiments the radial plot may be divided into 16 bins spaced evenly, to name some examples.

The BHA controller 235 may further separate the radial plot into two vertical hemispheres, a left hemisphere and a right hemisphere. Each hemisphere may encompass half of the bins, e.g. 4 bins in the 8-bin example and 8 bins in the 16-bin example. Where the radial plot is divided into up/down/left/right, the hemispheres may be split between left and right bins for purposes of this discussion. Further, the BHA controller 235 may determine one of the hemispheres to use for embodiments of the present disclosure. In some embodiments, the BHA controller 235 may select the left hemisphere, while in other embodiments the right hemisphere may be selected. The BHA controller 235 may dynamically make that determination, or alternatively may be pre-configured for a particular hemisphere.

The BHA controller 235 takes the measurement data from the selected hemisphere and uses it as the basis of the measurement data to be transmitted via a transceiver to the control system 195 at the surface. In some embodiments, the BHA controller 235 may simply take the measurement data from that selected hemisphere and transmit that data to the surface (in some embodiments after also compressing the data). In other embodiments, the BHA controller 235 may additionally perform averaging prior to transmitting. For example, starting at the top of the radial plot (as an example; the process may begin with another bin in the radial plot), the BHA controller 235 may average the measurement data of the given bin in the selected hemisphere with the measurement data of the mirroring bin in the unselected hemisphere. The BHA controller 235 may do this averaging with each bin in the selected hemisphere. The resulting averages are retained as the measurement data for the different bins in the selected hemisphere—thus, in a 16-bin example, there would be 8 averages to be transmitted as the measurement data for the 8 bins in the selected hemisphere.

The BHA controller 235 may then transmit these values to the surface, such as to the control system 195, for further processing, analysis, and use in steering the direction of the BHA 170 and to better understand the formations through which the BHA 170 is traversing. The values may reach the surface as real-time measurements (e.g., for systems having only delays comprised of substantially only data travel time latencies) with a reduced amount of bandwidth that still provides a better level of granularity for image log generation that currently available at the given bandwidth consumption level.

According to embodiments of the present disclosure, the control system 195 may include, among other things, an interface configured to display image logs and other borehole and/or formation characteristic data, as well as to potentially receive driller input during directional drilling to guide the wellbore in the target zones/formations. The control system 195 receives data used to produce the image logs and present the other formation characteristic data from the BHA controller 235.

Figure 2:
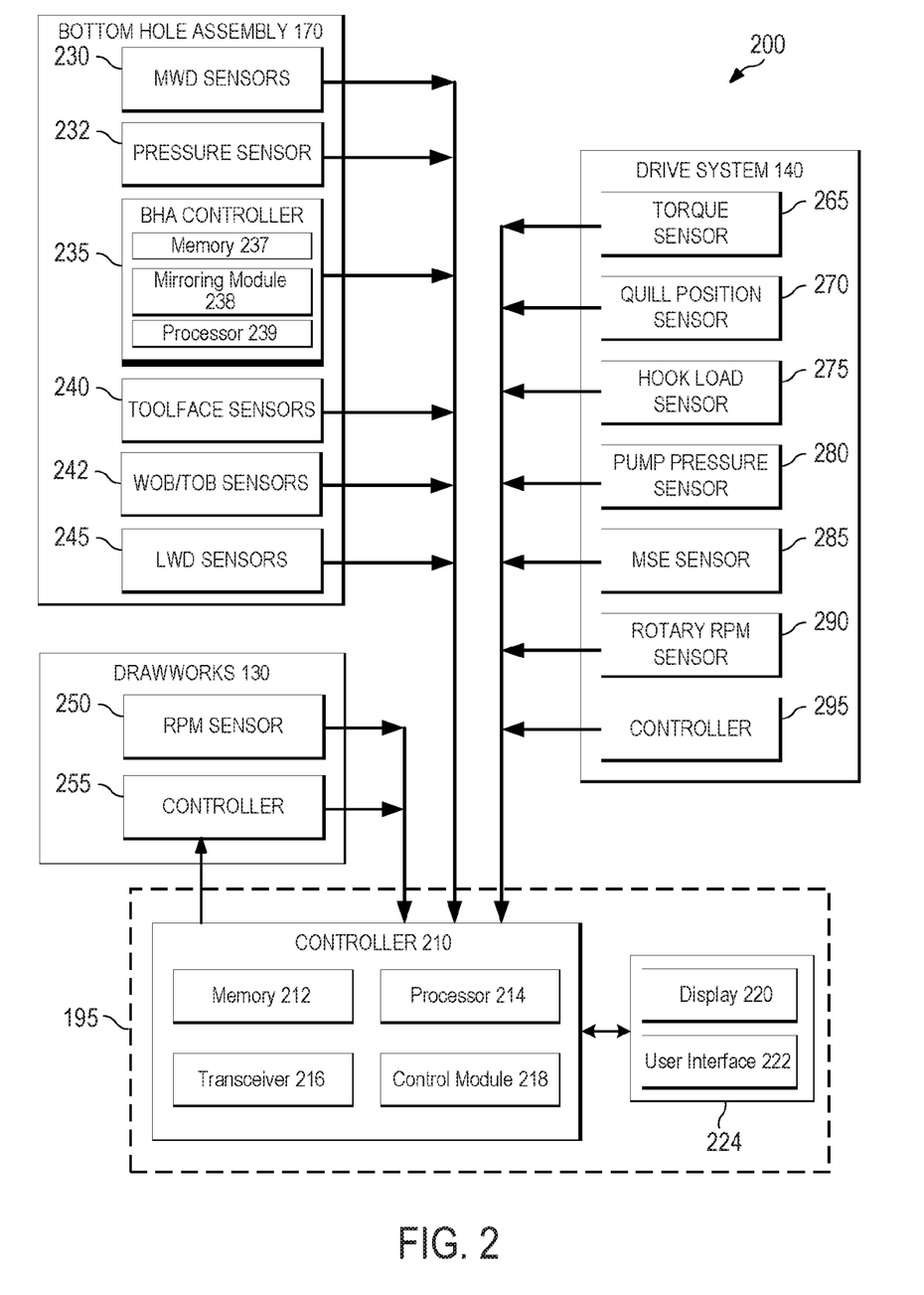
FIG. 2 is a block diagram of an apparatus shown as an exemplary control system according to one or more aspects of the present disclosure.

Turning to FIG. 2, a block diagram of an exemplary control system configuration 200 according to one or more aspects of the present disclosure is illustrated. In some implementations, the control system configuration 200 may be described with respect to the drawworks 130, top drive 140, BHA 170, and control system 195. The control system configuration 200 may be implemented within the environment and/or the apparatus 100 shown in FIG. 1.

The control system configuration 200 may include the BHA controller 235 at the BHA 170, a drawworks controller 255 at the drawworks 130, a controller 295 at the top drive system 140, and the control system 195. The control system 195 may include a controller 210 and may also include an interface system 224. Depending on the embodiment, these may be discrete components that are interconnected via wired and/or wireless means. In some embodiments, the interface system 224 and the controller 210 may be integral components of a single system that is in communication with the other controllers, including the BHA controller 235, the drawworks controller 255, and the controller 295.

The BHA controller 235 may include at least a memory 237, a processor 239, and a mirroring module 238. In some implementations, the BHA controller 235 may include the transceiver that transmits data to the surface control system 195. In other implementations, the transceiver may be otherwise a part of the BHA 170 and in communication with the BHA controller 235 and the other components of the BHA 170. The memory 237 may include a cache memory (e.g., a cache memory of the processor), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 237 may include a non-transitory computer-readable medium.

The memory 237 may store instructions. The instructions may include instructions that, when executed by the processor 239, cause the processor 239 to perform operations described herein with reference to the BHA controller 235 in connection with embodiments of the present disclosure. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 239 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the BHA controller 235 of the BHA 170 introduced in FIG. 1 above. The processor 239 may also be implemented as a combination of computing devices, e.g., a combination of a DSP and a microprocessor, a plurality of microprocessors, one or more microprocessors in conjunction with a DSP core, or any other such configuration.

In addition to the BHA controller 235, the BHA 170 may include one or more sensors, typically a plurality of sensors, located and configured about the BHA 170 to detect parameters relating to the drilling environment, the BHA 170 condition and orientation, and other information. The BHA 170 may include additional sensors/components beyond those illustrated in FIG. 2, which is simplified for purposes of illustration. The sensors/components may provide information that may be considered by the BHA controller 235 and/or the control system 195, for example downhole WOB, downhole TOB, downhole ΔP, BHA rotations per minute (RPM), azimuthal measurement data, and/or other data.

In the embodiment shown in FIG. 2, the BHA 170 includes MWD sensors 230. For example, the MWD sensor 230 may include an MWD shock/vibration sensor that is configured to detect shock and/or vibration in the MWD portion of the BHA 170, and an MWD torque sensor that is configured to detect a value or range of values for torque applied to the bit by the motor(s) of the BHA 170 (downhole TOB). The MWD sensors 230 may also include an MWD RPM sensor that is configured to detect the RPM of the bit of the BHA 170. The MWD sensors 230 may also include a downhole mud motor ΔP (differential pressure) sensor 232 (referred to simply herein as a downhole ΔP sensor 232) that is configured to detect a pressure differential value or range across the mud motor of the BHA 170. This may be a value in reference to the pressure just off-bottom and pressure once the bit touches bottom and starts drilling and experiencing torque. The data from these sensors may be sent via electronic signal or other signal to the BHA controller 235 and/or control system 195 as well via wired and/or wireless transmission.

The BHA 170 may also include a BHA RPM sensor, such as part of the MWD sensors 230. This sensor may detect the RPM of the BHA 170 itself, instead of the bit specifically as the other sensor introduced above. The data from the BHA RPM sensor may be sent via electronic signal or other signal to the BHA controller 235 and/or control system 195 as well via wired and/or wireless transmission.

The BHA 170 may also include one or more toolface sensors 240, such as a magnetic toolface sensor and a gravity toolface sensor that are cooperatively configured to detect the current toolface orientation, such as relative to magnetic north. The gravity toolface may detect toolface orientation relative to the Earth's gravitational field. In an exemplary embodiment, the magnetic toolface sensor may detect the current toolface when the end of the wellbore is less than about 7° from vertical, and the gravity toolface sensor may detect the current toolface when the end of the wellbore is greater than about 7° from vertical.

The BHA 170 may also include an MWD weight on bit/torque on bit sensor 242 (referred to simply herein as a downhole WOB/TOB sensor 242) that is configured to detect a value or range of values for downhole WOB and TOB at or near the BHA 170. The data from the downhole WOB/TOB sensor 242 may be sent via electronic signal or other signal to the BHA controller 235 and/or control system 195 via wired and/or wireless transmission.

The BHA 170 may also include logging while drilling (LWD) sensors 245. In addition to the multiple sensors described above with respect to MWD tools, the LWD sensors 245 may include sensors such as azimuthal measurement sensors, neutron porosity sensors, resistivity sensors, sonic sensors, density sensors, image sensors, magnetic resonance sensors, seismic sensors, etc. An example azimuthal sensor is a gamma ray sensor (e.g., a Geiger-Müller tube, a scintillation detect, etc.), which may be configured to read incoming gamma radiation. For example, these sensors may count the radiation as it is received and report that count periodically or in stream to the BHA controller 235. Embodiments of the present disclosure may be used on data resulting from any of the above sensors, e.g. azimuthal measurement sensors, that provide data from a 360-degree area of the borehole while the BHA 170 is in the borehole, such as during drilling.

At the BHA controller 235, the counts from the azimuthal measurement sensors may be tallied. In particular, the counts may be tallied per bin over a set period of time. At intervals where the BHA controller 235 is scheduled or ready to transmit data (e.g., pre-set intervals), the BHA controller 235 may begin the process of preparing mirror data to improve transmission bandwidth and possibly reduce statistical noise associated with the tallied data.

For example, the mirroring module 238 may receive the counts as they arrive from the azimuthal measurement sensors, or alternatively as interim totals after having been buffered by the azimuthal measurement sensors themselves.

The mirroring module 238 may include various hardware components and/or software components to implement the aspects of the present disclosure. For example, in some implementations the mirroring module 238 may include instructions stored in the memory 237 that causes the processor 239 to perform the operations described herein. In an alternative embodiment, the mirroring module 238 is a hardware module that interacts with the other components of the BHA controller 235 to perform the operations described herein.

The mirroring module 238 is used to assign counts to the appropriate bins organized within a radial plot. Further, the mirroring module 238 may be used to divide the radial plot along the vertical axis of the radial plot, thereby splitting the radial plot into first and second hemispheres (which in some implementations may be referred to as left and right hemispheres). In some embodiments, the mirroring module 238 may select which hemisphere to use as the basis of the data transmitted to the surface control system 195. In other embodiments, the mirroring module 238 may be preconfigured with a preferred hemisphere to use for the basis of mirroring.

When an interval comes for measurement data to be transmitted to the surface control system 195, the mirroring module 238 may in some embodiments take the measurement data from the selected hemisphere and transmit that measurement data to the surface control system 195. In some embodiments, the mirroring module 238 may compress the measurement data before sending, while in other embodiments the measurement data is sent as is. Alternatively, the mirroring module 238 may further average the data in order to both make the data actually sent more representative of both hemispheres as well as potentially reduce the statistical noise of the data prior to sending to the surface.

For example, the mirroring module 238 may start from the "top" of the radial plot, i.e. where the first and last-numbered bins are located, and work down. Thus, in a 16-bin scenario, the mirroring module 238 may first average the measurement data from bins 0 and 15, then 1 and 14, on down to bins 7 and 8 at the "bottom" of the radial plot. The results of the averaging may be stored per bin—i.e., an averaged data set stored for bin 0, a next for bin 1, etc., for all of the bins in the selected hemisphere. All the bins in the selected hemisphere may be averaged with their mirror counterpart in the non-selected hemisphere sequentially or in parallel. A similar approach may be taken in 8-bin or 4-bin scenarios in like fashion. After averaging, the averaged data sets for the bins in the selected hemisphere may be transmitted to the surface control system 195 (e.g., with compression or without, as noted above).

For example, the transmission may occur via telemetry, mud pulse, EM, wired pipe, or other types of connections including for example local area network (LAN), wide area network (WAN), etc. These may be transmitted in real time as they are received/calculated. At the surface, the control system 195 may receive the data transmitted from the downhole components, including from the BHA controller 235 and, in some embodiments, one or more of the downhole sensors as well. The controller 210 of the control system 195 may use this data as discussed further herein.

The controller 210 includes a memory 212, a processor 214, a transceiver 216, and a control module 218. The memory 212 may include a cache memory (e.g., a cache memory of the processor 214), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 212 may include a non-transitory computer-readable medium. The memory 212 may store instructions. The instructions may include instructions that, when executed by the processor 214, cause the processor 214 to perform operations described herein with reference to the controller 210 in connection with embodiments of the present disclosure.

The processor 214 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the aspects introduced in FIG. 1 above. The processor 214 may also be implemented as a combination of computing devices, e.g., a combination of a DSP and a microprocessor, a plurality of microprocessors, one or more microprocessors in conjunction with a DSP core, or any other such configuration.

The transceiver 216 may include a LAN, WAN, Internet, satellite-link, and/or radio interface to communicate bi-directionally with other devices, such as the top drive 140, drawworks 130, BHA 170, and other networked elements. For example, the transceiver 216 may include multiple ports corresponding to the different connections/access technologies used to communicate between components and locations (e.g., different ports for communication connections, as well as with different sensors that provide inputs into the controller 210 for control, etc.).

The control system 195 may also include an interface system 224. The interface system 224 includes a display 220 and a user interface 222. The interface system 224 may also include a memory and a processor as described above with respect to controller 210. In some implementations, the interface system 224 is separate from the controller 210, while in other implementations the interface system 224 is part of the controller 210. Further, the interface system 224 may include a user interface 222 with a simplified display 220 or, in some embodiments, not include the display 220.

The display 220 may be used for visually presenting information to the user in textual, graphic, or video form. The display 220 may also be utilized by the user to input drilling parameters, limits, or set point data in conjunction with the input mechanism of the user interface 222, such as a set point for a desired differential pressure, weight on bit, torque on bit, rate of penetration, etc., as well as for purposes of geosteering and formation characterization/analysis according to embodiments of the present disclosure. For example, the input mechanism may be integral to or otherwise communicably coupled with the display 220. The input mechanism of the user interface 222 may also be used to input additional settings or parameters.

The input mechanism of the user interface 222 may include a keypad, voice-recognition apparatus, dial, button, switch, slide selector, toggle, joystick, mouse, data base and/or other conventional or future-developed data input device. Such a user interface 222 may support data input from local and/or remote locations. Alternatively, or additionally, the user interface 222 may permit user-selection of predetermined profiles, algorithms, set point values or ranges, and well plan profiles/data, such as via one or more drop-down menus. The data may also or alternatively be selected by the controller 210 via the execution of one or more database look-up procedures. In general, the user interface 222 and/or other components within the scope of the present disclosure support operation and/or monitoring from stations on the rig site as well as one or more remote locations with a communications link to the system, network, LAN, WAN, Internet, satellite-link, and/or radio, among other means.

According to embodiments of the present disclosure, the control system 195 may receive the count values from the BHA 170 via telemetry in real time. For example, in some embodiments the count values may arrive in the form of the measurement data from the selected hemisphere, while in other embodiments the count values may arrive in the form of the averaged data sets for the bins from the selected hemisphere. Further, in some embodiments the data may have been compressed, in which case the control system 195 may further decompress the data for access thereto. With the data received, the control system 195 may determine the bins that the respective data sets are associated with (i.e., 0, 1, 2, etc.) in a radial plot, and mirror those values to the bins on the mirror side of the non-selected hemisphere of the radial plot.

After mirroring to repopulate the bins of the hemisphere that whose data was not transmitted, the complete data set may be analyzed, for example to generate one or more image logs, and presented to one or more users such as via the display 220 or other user interface. The user interface 222 may receive one or more commands from a user to dynamically (i.e., during drilling) geosteer the BHA 170 based on the data, such as to remain within a pay zone/formation, leave a formation, etc. The controller 210 may transmit commands to geosteer the BHA 170.

The data may further or alternatively be used via the control system 195 to determine other actions, such as generating a density image for use in determine whether and how to re-geosteer the well, formation characterization such as to identify existing faults and fractures to avoid water contamination, etc.

Turning to the top drive 140 components, the top drive 140 includes one or more sensors or detectors. The top drive 140 includes a rotary torque sensor 265 (also referred to herein as a torque sensor 265) that is configured to detect a value or range of the reactive torsion of the quill 145 or drill string 155. For example, the torque sensor 265 may be a torque sub physically located between the top drive 140 and the drill string 155. As another example, the torque sensor 265 may additionally or alternative be configured to detect a value or range of torque output by the top drive 140 (or commanded to be output by the top drive 140), and derive the torque at the drill string 155 based on that measurement. Detected voltage and/or current may be used to derive the torque at the interface of the drill string 155 and the top drive 140. The controller 295 is used to control the rotational position, speed and direction of the quill 145 or other drill string component coupled to the top drive 140 (such as the quill 145 shown in FIG. 1), shown in FIG. 2. The torque data may be sent via electronic signal or other signal to the controller 210 via wired and/or wireless transmission (e.g., to the transceiver 216).

The top drive 140 may also include a quill position sensor 270 that is configured to detect a value or range of the rotational position of the quill, such as relative to true north or another stationary reference. The top drive 140 may also include a hook load sensor 275 (e.g., that detects the load on the hook 135 as it suspends the top drive 140 and the drill string 155) and a rotary RPM sensor 290. The rotary RPM sensor 290 is configured to detect the rotary RPM of the drill string 155. This may be measured at the top drive or elsewhere, such as at surface portion of the drill string 155 (e.g., reading an encoder on the motor of the top drive 140). These signals, including the RPM detected by the RPM sensor 290, may be sent via electronic signal or other signal to the controller 210 via wired and/or wireless transmission.

The drive system represented by top drive 140 also includes a surface pump pressure sensor or gauge 280 (e.g., that detects the pressure of the pump providing mud or otherwise powering the down-hole motor in the BHA 170 from the surface), referred to as a surface differential pressure ($\Delta P$) sensor 280. The surface $\Delta P$ sensor 280 is configured to detect a pressure differential value between the surface standpipe pressure while the BHA 170 is just off-bottom from bottom 173 and surface standpipe pressure once the bit of BHA 170 touches bottom 173 and starts drilling and experiencing torque (and generating cuttings). Typically, the surface $\Delta P$ detected by the surface $\Delta P$ sensor 280 represents how much pressure the mud motor at the BHA 170 is generating in the system, which is a function of mud motor torque. The drive system represented by top drive 140 may also include an MSE sensor 285. The MSE sensor 285 may detect the MSE representing the amount of energy required per unit volume of drilled rock to remove it, whether directly sensed or calculated based on sensed data.

The drawworks 130 may include one or more sensors or detectors that provide information to the controller 210. The drawworks 130 may include an RPM sensor 250. The RPM sensor 250 is configured to detect the rotary RPM of the drilling line 125, which corresponds to the speed of hoisting/lowering of the drill string 155. This may be measured at the drawworks 130. The RPM detected by the RPM sensor 250 may be sent via electronic signal or other signal to the controller 210 via wired or wireless transmission. The drawworks 130 may also include a controller 255. The controller 255 is used to control the speed at which the drill string 155 is hoisted or lowered, for example as dictated by the control system 195.

Returning to the controller 210, the control module 218 may be used for various aspects of the present disclosure. The control module 218 may include various hardware components and/or software components to implement the aspects of the present disclosure. For example, in some implementations the control module 218 may include instructions stored in the memory 212 that causes the processor 214 to perform the operations described herein. In an alternative embodiment, the control module 218 is a hardware module that interacts with the other components of the controller 210 to perform the operations described herein.

The control module 218 may be used to access the count data from the BHA 170, decompress where appropriate, and mirror the data to the non-selected hemisphere. The control module 218 may further generate the image logs and other logs from the data, and receive the inputs from one or more users that is converted to commands for the other components of the system (including the top drive 140 and BHA 170) to geosteer during drilling.

Figure 3A:
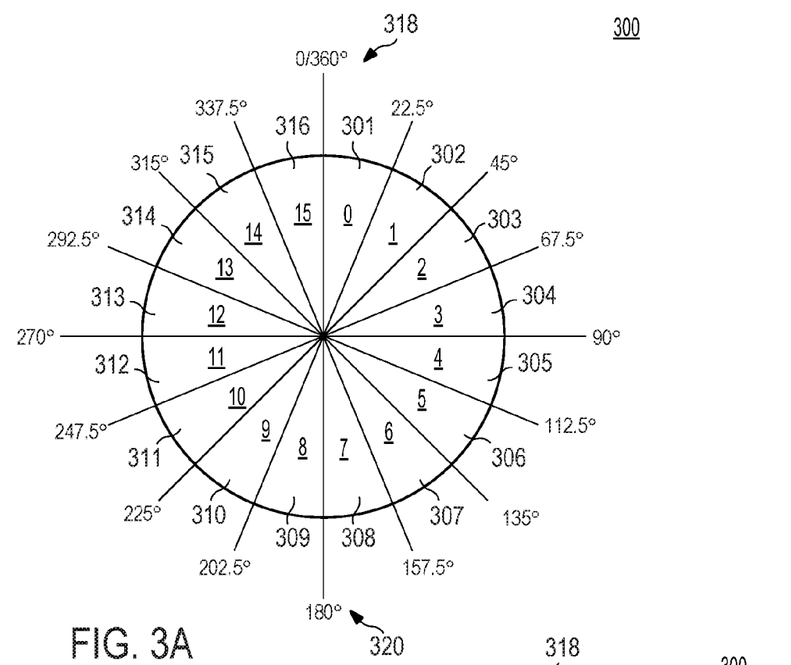
FIG. 3A is a diagram illustrating an exemplary radial plot according to one or more aspects of the present disclosure.

An example of a radial plot is illustrated in FIG. 3A, according to one or more aspects of the present disclosure. The radial plot 300 in FIG. 3A is broken down into 16 bins of equal size (here, 22.5° per bin). In other embodiments, the radial plot may be made from 8 bins of equal size, thus 45° per bin. In yet other embodiments, the radial plot may be simplified to up/down/left/right values, either in a 4-bin embodiment or by averaging multiple bins together in the 8-bin or 16-bin embodiments. For simplicity of discussion, the 16-bin example will be used herein, with the teachings applicable to the other embodiments as well.

In some implementations, numbering of the bins may start at 0 and therefore range from 0 to 15. Thus, with numbering of the bins in the 16-bin example starting at 0, bin 0, also identified as bin 301, extends from 0° to 22.5°. Bin 1, also identified as bin 302, extends from 22.5° to 45°. Bin 2, also identified as bin 303, extends from 45° to 67.5°. Bin 3, also identified as bin 304, extends from 67.5° to 90°. Bin 4, also identified as bin 305, extends from 90° to 112.5°. Bin 5, also identified as bin 306, extends from 112.5° to 135°. Bin 6, also identified as bin 307, extends from 135° to 157.5°. Bin 7, also identified as bin 308, extends from 157.5° to 180°. Bins 301 through 308 constitute one of the hemispheres of the radial plot 300, in this example the right hemisphere.

Bin 8, also identified as bin 309, extends from 180° to 202.5°. Bin 9, also identified as bin 310, extends from 202.5° to 225°. Bin 10, also identified as bin 311, extends from 225° to 247.5°. Bin 11, also identified as bin 312, extends from 247.5° to 270°. Bin 12, also identified as bin 313, extends from 270° to 292.5°. Bin 13, also identified as bin 314, extends from 292.5° to 315°. Bin 14, also identified as bin 315, extends from 315° to 337.5°. Bin 15, also identified as bin 316, extends from 337.5° to 360°. Bins 309 through 316 constitute the second of the hemispheres of the radial plot 300, in this example the left hemisphere. The numbering of the bins is exemplary only and may be arbitrary (e.g., any numbering may be used, and start at any bin of the radial plot 300, etc.); the numbering is as shown in FIG. 3A to aid in illustration and discussion of embodiments of the present disclosure.

Figure 3B:
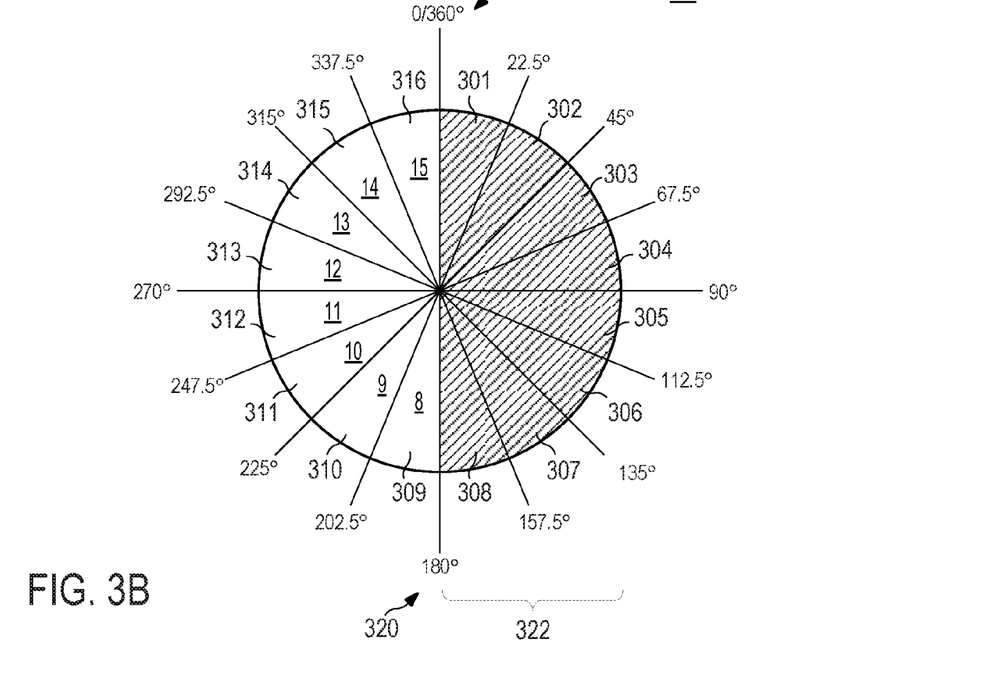
FIG. 3B is a diagram illustrating an exemplary radial plot according to one or more aspects of the present disclosure.

Turning now to FIG. 3B, an example use of the radial plot 300 is provided according to embodiments of the present disclosure. The example continues the 16-bin description for ease of reference. As illustrated, at a time (i.e., an interval) where the BHA controller 235 is ready to send measurement data from an azimuthal measurement sensor (such as a gamma ray sensor), the BHA controller 235 may have the measurement data sorted into the respective bins 301-316 as appropriate for the data that had been collected. The BHA controller 235 may select a hemisphere for which the BHA controller 235 will send the data of the associated bins.

In the example of FIG. 3B, the right hemisphere 322 has been selected. This is exemplary only. In other embodiments, the BHA controller 235 may have alternatively selected the left hemisphere, whether dynamically or according to a predetermined approach programmed in memory 237 (for example). Having selected right hemisphere 322, the BHA controller 235 prepares the measurement data from the bins 301 through 308 for transmission to the surface control system 195 (instead of all 16 bins 301-316). Thus, where a string of data for a bin may have 8 bits, transmitting the strings of data for all 16 bins would amount to 128 bits total, which compared to a 10 bits per second transfer rate (or thereabouts) is relatively large. Embodiments of the present disclosure may reduce the bandwidth required in half by transmitting only bins 301-308. Further, in some embodiments the data may be compressed on top of transmitting only the right hemisphere 322's data.

Figure 3C:
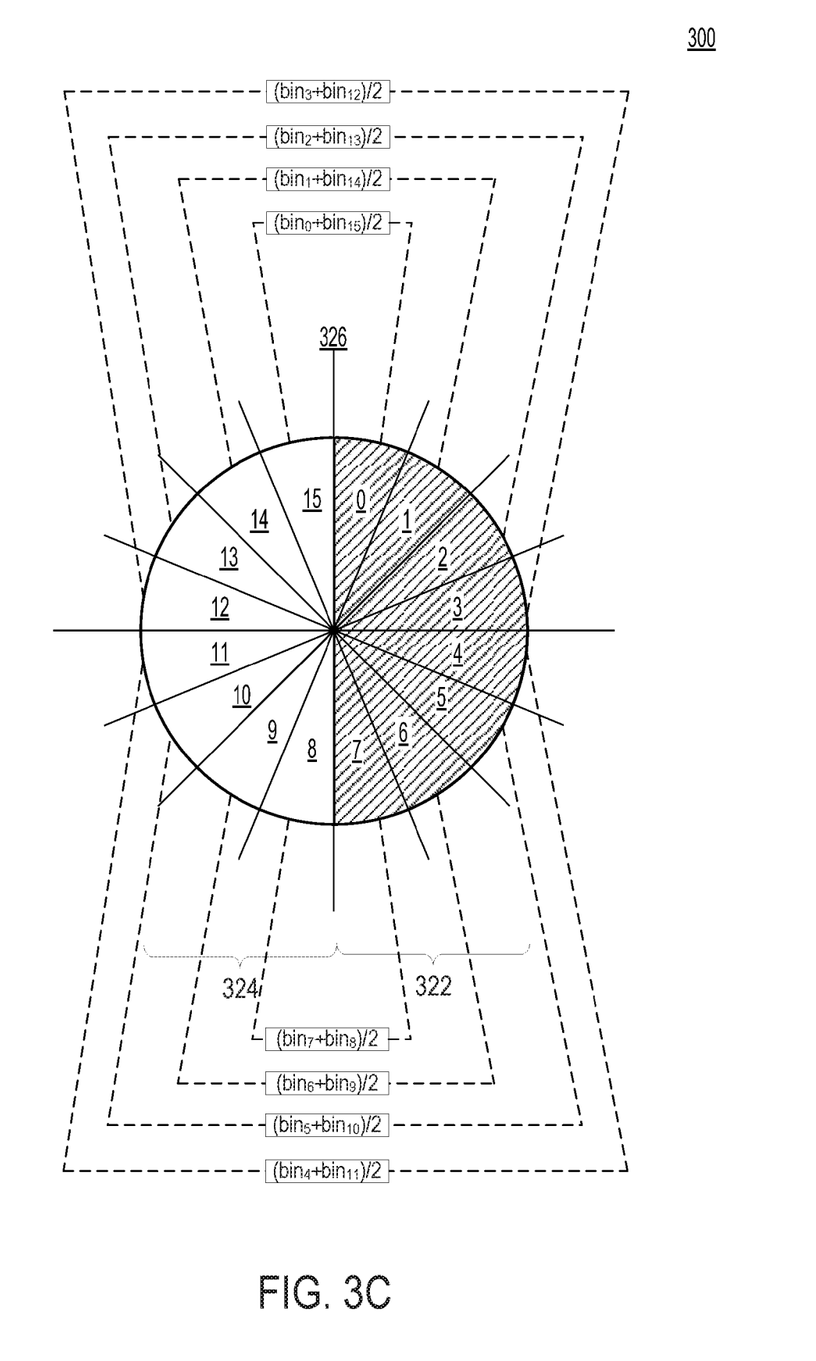
FIG. 3C is a diagram illustrating an exemplary radial plot according to one or more aspects of the present disclosure.

To make the measurement data more representative, in some embodiments the measurement data of each bin 301-308 of the selected right hemisphere 322 may be further averaged with corresponding data from bins 316 through 309 of the left hemisphere 324, as illustrated in FIG. 3C according to embodiments of the present disclosure.

As shown, bins 0 and 15 are mirrored about the vertical axis 326, and therefore the BHA controller 235 averages their measurement data together, for example by adding the data of bin 0 with the data of bin 15, and dividing by two. The averaged data is then stored for transmission as the data from bin 0. Likewise, the data of bin 1 may be added to the data of bin 14 and divided by two, and the averaged results stored for transmission as the data from bin 1. The data of bin 2 may be added to the data of bin 13 and divided by two, and stored for transmission as the data from bin 2. The data of bin 3 may be added to the data of bin 12 and divided by two, and stored for transmission as the data from bin 3. The data of bin 4 may be added to the data of bin 11 and divided by two, and stored for transmission as the data from bin 4. The data of bin 5 may be added to the data of bin 10 and divided by two, and stored for transmission as the data from bin 5. The data of bin 6 may be added to the data of bin 9 and divided by two, and stored for transmission as the data from bin 6. Finally, the data of bin 7 may be added to the data of bin 8 and divided by two, and stored for transmission as the data from bin 7.

These average data values are then sent as the data from their respective bins 0 through 7 to the control system 195. As a result, the transmission to the control system 195 is reduced in bandwidth requirements to half the amount in the 16-bin scenario (and likewise in the 8-bin scenario). The averaged data also is smoothed in a way that reduces statistical noise that may be associated with the raw measurement data (e.g., from a gamma ray sensor). The resulting smoothing may aid in producing better image log quality by the control system 195 at the surface.

In other embodiments where up/down/left/right are instead used, the BHA controller 235 may transmit the values for the locations in the radial plot 300 associated with bins 0 and 15 as the "up" data set, the values for the locations associated with bins 7 and 8 as the "down" data set, and the values for the locations associated with bins 11 and 12 as the "left" data set. Alternatively, the data from all of the bins in a quarter of the radial plot 300 may be averaged together to constitute that data set (e.g., the data of bins 0, 1, 14, and 15 for the "up" data set, etc.). Further, the data from the "left" data set may be averaged with that from the "right" data set before transmission in similar fashion as laid out above.

Figure 4:
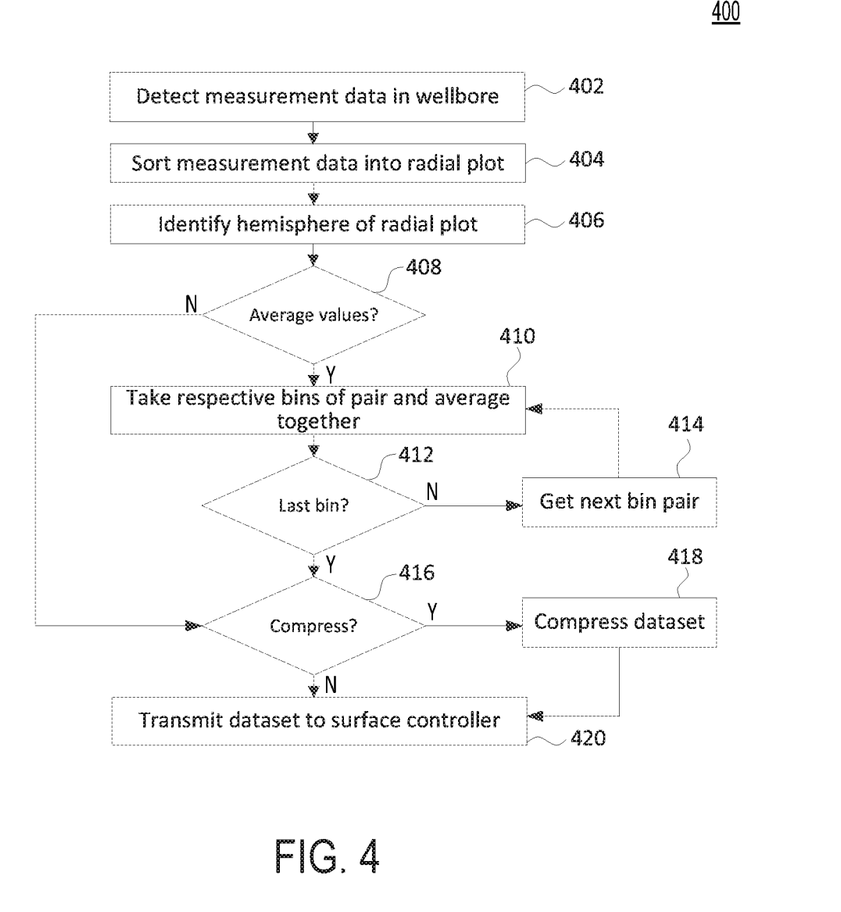
FIG. 4 is a flow chart showing an exemplary process for reducing bandwidth consumption for binning data based on mirroring according to aspects of the present disclosure.

FIG. 4 is a flow chart showing an exemplary process 400 for reducing bandwidth consumption for binning data based on mirroring according to aspects of the present disclosure. The method 400 may be performed, for example, with respect to the BHA controller 235 of the BHA 170 discussed above. It is understood that additional steps can be provided before, during, and after the steps of method 400, and that some of the steps described can be replaced or eliminated from the method 400.

At block 402, the BHA controller 235 receives measurement data detected by an azimuthal measurement sensor while the BHA 170 is in a wellbore, such as wellbore 160 of FIG. 1.

At block 404, the BHA controller 235 sorts the measurement data detected at block 402 into corresponding bins of a radial plot, such as radial plot 300 of FIG. 3A (which may have any number of bins, such as 16 in the example).

At block 406, the BHA controller 235 identifies a hemisphere (i.e., left or right separated by the vertical axis 326) of the radial plot 300 for which to transmit representative data to a surface control system 195. In some embodiments, this is identified based on a pre-determined set of rules such as may have been programmed in the BHA 235 previously. In some examples, the hemisphere may be dynamically switched, for example by a command from a user at the surface control system 195.

In other embodiments, the hemisphere may be selected by the BHA controller 235 each time data is to be sent, prior to data being sent for multiple time periods, etc. If the BHA controller 235 does the selection, then it may also assert a flag (i.e., one bit) to identify which hemisphere is being used (i.e. unasserted representing the left hemisphere and asserted representing the right hemisphere to name an example). In other examples, the flag may be left off to conserve bandwidth usage, and the surface control system 195 may assume either hemisphere for purposes of mirroring the data for recreation.

At decision block 408, if the BHA controller 235 has been configured or requested to average bin values prior to sending the data set to the surface control system 195, then the method 400 proceeds to block 410.

At block 410, the BHA controller 235 averages the measurement data of mirroring bins together—for example from FIG. 3C, bins 0 and 15, bins 1 and 14, etc. through the bins in the selected hemisphere.

At decision block 412, if there are still bins remaining in the selected hemisphere to iterate through for averaging, then the method 400 proceeds to block 414.

At block 414, the BHA controller 235 iterates to the next bin—for example, if averaging was just completed for bins 0 and 15, and the right hemisphere was selected, then the bins 1 and 14 may be iterated to for averaging. The method 400 then returns from block 414 to block 410 and proceeds as discussed above and further below.

Returning to decision block 408, if the BHA controller 235 has not been configured or requested to average bin values, then the method 400 proceeds to decision block 416. In some embodiments, the BHA controller 235 may dynamically be changed between averaging or not averaging bin values according to commands from a user at the surface control system 195. Thereby, the averaging capability may be dynamically activated or deactivated during operation per the needs/desires of the operator(s). Further, an image log may include an identification of whether averaging is activated or not for the different sections of data rendered therein.

Returning to decision block 412, if the last bin has been averaged, then the method 400 proceeds to decision block 416. Thus, from decision block 408 if values are not averaged or decision block 412 if the last bin has been averaged, decision block 416 is next.

At decision block 416, if the BHA controller 235 has been configured or requested to compress the data (whether averaged or not), then the method 400 proceeds to block 418.

At block 418, the BHA controller 235 compresses the data of the different bins of the hemisphere identified at block 406 prior to transmitting the data to the surface control system 195. In some embodiments, the compression feature (where included) may further be changeable, so that a user at the surface control system 195 may activate or deactivate the capability during operation. As another alternative, the BHA controller 235 may monitor the status of the transceiver of the BHA 170 and, depending upon the actual data rates achieved over time, automatically activate or deactivate compression (e.g., during lower realized data rates activate compression and during higher realized rates deactivate).

Returning to decision block 416, if compression is not activated/requested/available, then the method 400 proceeds to block 420.

At block 420, whether from decision block 416 or block 418, the BHA controller 235 transmits via a transceiver the measurement data to the surface control system 195. This may be data that was not averaged for a hemisphere, data that was averaged with data from bins of the non-selected hemisphere, and compressed or not. The surface control system 195 may use the transmitted measurement data to mirror it to the non-selected hemisphere for image log generation and further control actions.

Figure 5:
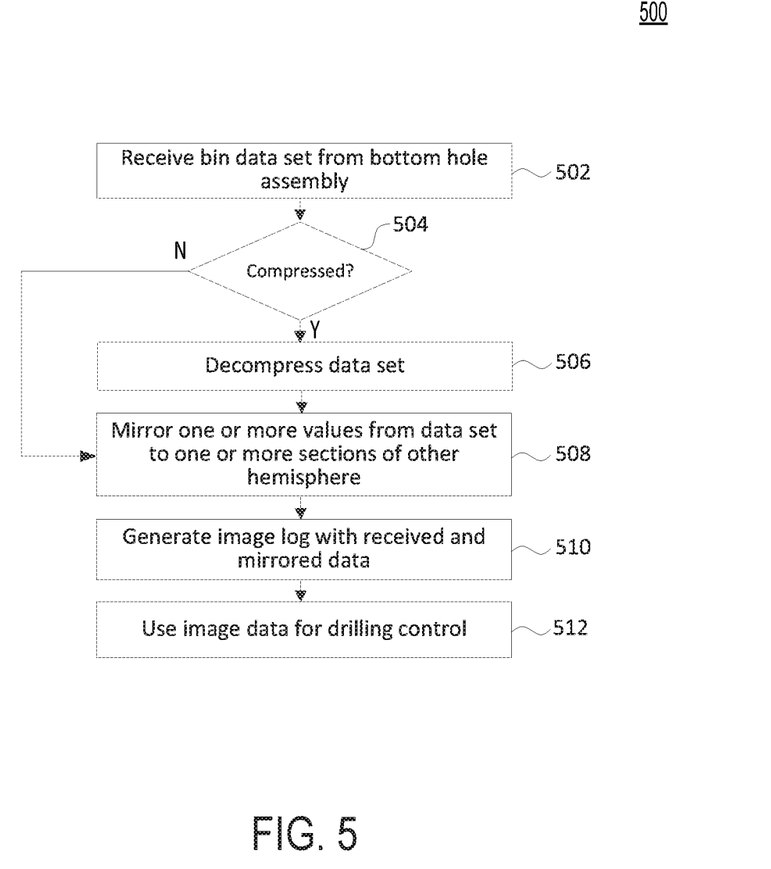
FIG. 5 is a flow chart showing an exemplary process for mirroring azimuthal measurement data according to aspects of the present disclosure.

This is shown in FIG. 5, a flow chart showing an exemplary process 500 for mirroring azimuthal measurement data according to aspects of the present disclosure is described. The method 500 may be performed, for example, with respect to the controller 210 of the surface control system 195 discussed above. It is understood that additional steps can be provided before, during, and after the steps of method 500, and that some of the steps described can be replaced or eliminated from the method 500.

At block 502, the controller 210 receives a measurement data set from the BHA controller 235. This may constitute a "raw" data set for bins of a hemisphere that has not been averaged, or it may constitute averaged data per bin as discussed above.

At decision block 504, if the BHA controller 235 had compressed the measurement data, then the method 500 proceeds to block 506.

At block 506, the controller 210 decompresses the measurement data (per bin) that it had received from the BHA controller 235 at block 502.

At block 508, the controller 210 mirrors the measurement data per bin that it received from the BHA controller 235. For example, if the measurement data from the BHA controller 235 was for the bins from a right hemisphere of a radial plot, then the controller 210 mirrors, for each bin, the data associated therewith to the mirroring bin in the other hemisphere. For example, if the right hemisphere 322 was selected, then the controller 210 would have received data corresponding to bins 0 through 7. Thus, mirroring would constitute copying the data associated with a given bin and associating it with the mirroring bin—i.e., copying the data associated with bin 0 for bin 15, bin 1 for bin 14, etc. through all the bins (8 bins in a 16-bin scenario, 4 bins in an 8-bin scenario, etc.).

Returning to decision block 504, if the BHA controller 235 had not compressed the measurement data, then the method 500 proceeds to block 508 as discussed above and laid out further below.

From block 508, the method 500 proceeds to block 510. At block 510, the controller 210 generates an image from the bin data. For example, while the controller 210 is receiving the bin data in real time, it creates that portion of the image after the last bin data and up to the last data received previously.

At block 512, the controller 210 determines how to steer the BHA 170 while drilling (whether directional or not) based on the image log and the bin data generally. For example, the controller 210 may receive a command from a user reviewing the image log to change direction to remain in (or enter) a desired formation. As another example, the controller 210 may analyze the bin data and determine without manual input how to steer the BHA 170 according to a well plan.

Accordingly, embodiments of the present disclosure provide improvements to geosteering control by improving bandwidth usage in communications between a BHA controller and a surface control system. The improvement in bandwidth usage results at least by the reduction of data transmitted for the un-selected hemisphere. In some embodiments the reduction is around 50%, while in other embodiments it may be around 25% (e.g., where up/down/left/right is the basis for data transmission instead of 8 or 16 bins). However, though the bandwidth usage is reduced, many bins are still able to be transmitted to create better image logs (according to the particular granularity available from 8 or 16 bins, etc.). Further, if the measurement data of the bins that mirror each other around the radial plot are averaged, then this further adds the benefit of smoothing the data in a way that reduces the statistical noise that may be associated with the raw sensor measurements.

In view of the above and the figures, one of ordinary skill in the art will readily recognize that the present disclosure introduces a bottom hole assembly comprising a sensor configured to detect measurement data comprising approximately 360 degrees of a borehole while the bottom hole assembly is in the borehole; a processor configured to arrange the measurement data in a radial plot having a first hemisphere with a first subset of the measurement data and a second hemisphere with a second subset of the measurement data; and a transceiver configured to transmit the first subset of the measurement data to a surface controller configured to mirror the first subset of the measurement data to represent the second subset of the measurement data for the second hemisphere for image log generation.

The BHA may include wherein the processor is further configured to average values of the first subset of the measurement data with respective values of the second subset of the measurement data into an average values subset of the measurement data, and the transceiver is further configured to transmit the average values subset of the measurement data as the first subset of the measurement data. The BHA may further include wherein the radial plot comprises 16 total bins spaced around the radial plot numbered 0 to 15, with bins 0 and 15 located at a top portion of the radial plot and bins 7 and 8 located at a bottom portion of the radial plot, and the processor is further configured, for the averaging, to average bins 0 and 15 together, bins 1 and 14 together, bins 2 and 13 together, bins 3 and 12 together, bins 4 and 11 together, bins 5 and 10 together, bins 6 and 9 together, and bins 7 and 8 together to constitute the average values subset of the measurement data. The BHA may further include wherein the radial plot comprises 8 total bins spaced around the radial plot numbered 0 to 7, with bins 0 and 7 located at a top portion of the radial plot and bins 3 and 4 located at a bottom portion of the radial plot, and the processor is further configured, for the averaging, to average bins 0 and 7 together, bins 1 and 6 together, bins 2 and 5 together, and bins 3 and 4 together to constitute the average values subset of the measurement data. The BHA may further include wherein the processor is further configured to compress the first subset of the measurement data prior to the transceiver transmitting the first subset of the measurement data to the surface controller. The BHA may further include wherein the first subset of the measurement data comprises an up value corresponding to an upper portion of the radial plot, a down value corresponding to a lower portion of the radial plot, and a left value corresponding to a left portion of the radial plot, and the surface controller is further configured to mirror the first subset of the measurement data by copying the left value as a right value corresponding to a right portion of the radial plot. The BHA may further include wherein the sensor comprises a gamma imaging sensor.

The present disclosure also includes a drilling rig apparatus comprising a bottom hole assembly comprising a sensor configured to detect measurement data from a borehole while the bottom hole assembly is in the borehole; and a bottom hole assembly transceiver configured to transmit a first subset of the measurement data associated with a first hemisphere of a radial plot. The drilling rig apparatus may further include a surface control system comprising a surface transceiver configured to receive the first subset of the measurement data associated with the first hemisphere; and a surface controller configured to mirror the first subset of the measurement data associated with the first hemisphere to represent a second subset of the measurement data associated with a second hemisphere of the radial plot, and to generate an image log using the first subset of the measurement data and the represented second subset of the measurement data.

The drilling rig apparatus may include wherein the bottom hole assembly further comprises a processor configured to arrange the measurement data into the first subset of the measurement data associated with the first hemisphere and the second subset of the measurement data associated with the second hemisphere. The drilling rig apparatus may further include wherein the processor is further configured to average values of the first subset of the measurement data with respective values of the second subset of the measurement data into an average values subset of the measurement data, and the bottom hole assembly transceiver is further configured to transmit the average values subset of the measurement data as the second subset of the measurement data. The drilling rig apparatus may further include wherein the radial plot comprises 16 total bins spaced around the radial plot numbered 0 to 15, with bins 0 and 15 located at a top portion of the radial plot and bins 7 and 8 located at a bottom portion of the radial plot, and the processor is further configured, for the averaging, to average bins 0 and 15 together, bins 1 and 14 together, bins 2 and 13 together, bins 3 and 12 together, bins 4 and 11 together, bins 5 and 10 together, bins 6 and 9 together, and bins 7 and 8 together to constitute the average values subset of the measurement data. The drilling rig apparatus may further include wherein the first subset of the plurality of measurement data comprises an up value corresponding to an upper portion of the radial plot, a down value corresponding to a lower portion of the radial plot, and a left value corresponding to a left portion of the radial plot, and the surface controller is configured to copy the left value as a right value corresponding to a right portion of the radial plot. The drilling rig apparatus may further include wherein the sensor comprises a gamma imaging sensor. The drilling rig apparatus may further include wherein the sensor comprises a density imaging sensor.

The present disclosure also includes a method comprising detecting, by a sensor of a bottom hole assembly in a wellbore, a plurality of measurement data comprising approximately 360 degrees of the wellbore while the bottom hole assembly is in the wellbore; sorting, by the bottom hole assembly, the plurality of measurement data into a radial plot having a first hemisphere with a first subset of the plurality of measurement data and a second hemisphere with a second subset of the plurality of measurement data; and transmitting, from the bottom hole assembly, the first subset of the plurality of measurement data to a surface controller configured to mirror the first subset of the plurality of measurement data to represent the second subset of the plurality of measurement data for the second hemisphere for image log generation.

The method also includes averaging, by the bottom hole assembly, values of the first subset of the measurement data with respective values of the second subset of the measurement data into an average values subset of the measurement data, wherein the transmitting further comprises transmitting the average values subset of the measurement data as the first subset of the measurement data. The method may further include wherein the radial plot comprises 16 total bins numbered 0 to 15, the averaging further comprising averaging, by the bottom hole assembly, bins 0 and 15 together, bins 1 and 14 together, bins 2 and 13 together, bins 3 and 12 together, bins 4 and 11 together, bins 5 and 10 together, bins 6 and 9 together, and bins 7 and 8 together to constitute the average values subset of the measurement data, wherein bins 0 and 15 are located at a top portion of the radial plot and bins 7 and 8 are located at a bottom portion of the radial plot. The method may further include wherein the radial plot comprises 8 total bins numbered 0 to 7, the averaging further comprising averaging, by the bottom hole assembly, bins 0 and 7 together, bins 1 and 6 together, bins 2 and 5 together, and bins 3 and 4 together to constitute the average values subset of the measurement data, wherein bins 0 and 7 are located at a top portion of the radial plot and bins 3 and 4 are located at a bottom portion of the radial plot. The method may further include compressing, by the bottom hole assembly, the first subset of the measurement data prior transmitting the first subset of the measurement data to the surface controller. The method may further include wherein the sorting further comprises sorting the first subset of the measurement data into an up value corresponding to an upper portion of the radial plot, a down value corresponding to a lower portion of the radial plot, and a left value corresponding to a left portion of the radial plot, and the surface controller is configured to mirror the first subset of the measurement data by copying the left value as a right value corresponding to a right portion of the radial plot.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A bottom hole assembly, comprising:
 a sensor configured to detect measurement data comprising approximately 360 degrees of a borehole while the bottom hole assembly is in the borehole;
 a processor configured to arrange the measurement data in a radial plot having a first hemisphere with a first subset of the measurement data and a second hemisphere with a second subset of the measurement data; and
 a transceiver configured to transmit the first subset of the measurement data to a surface controller configured to mirror the first subset of the measurement data to represent the second subset of the measurement data for the second hemisphere for image log generation.

2. The bottom hole assembly of claim 1, wherein:
 the processor is further configured to average values of the first subset of the measurement data with respective values of the second subset of the measurement data into an average values subset of the measurement data, and
 the transceiver is further configured to transmit the average values subset of the measurement data as the first subset of the measurement data.

3. The bottom hole assembly of claim 2, wherein:
 the radial plot comprises 16 total bins spaced around the radial plot numbered 0 to 15, with bins 0 and 15 located at a top portion of the radial plot and bins 7 and 8 located at a bottom portion of the radial plot, and
 the processor is further configured, for the averaging, to average bins 0 and 15 together, bins 1 and 14 together, bins 2 and 13 together, bins 3 and 12 together, bins 4 and 11 together, bins 5 and 10 together, bins 6 and 9 together, and bins 7 and 8 together to constitute the average values subset of the measurement data.

4. The bottom hole assembly of claim 2, wherein:
 the radial plot comprises 8 total bins spaced around the radial plot numbered 0 to 7, with bins 0 and 7 located at a top portion of the radial plot and bins 3 and 4 located at a bottom portion of the radial plot, and
 the processor is further configured, for the averaging, to average bins 0 and 7 together, bins 1 and 6 together, bins 2 and 5 together, and bins 3 and 4 together to constitute the average values subset of the measurement data.

5. The bottom hole assembly of claim 1, wherein the processor is further configured to:
 compress the first subset of the measurement data prior to the transceiver transmitting the first subset of the measurement data to the surface controller.

6. The bottom hole assembly of claim 1, wherein:
 the first subset of the measurement data comprises an up value corresponding to an upper portion of the radial plot, a down value corresponding to a lower portion of the radial plot, and a left value corresponding to a left portion of the radial plot, and
 the surface controller is further configured to mirror the first subset of the measurement data by copying the left value as a right value corresponding to a right portion of the radial plot.

7. The bottom hole assembly of claim 1, wherein the sensor comprises a gamma imaging sensor.

8. A drilling rig apparatus, comprising:
 a bottom hole assembly comprising:
  a sensor configured to detect measurement data from a borehole while the bottom hole assembly is in the borehole; and
  a bottom hole assembly transceiver configured to transmit a first subset of the measurement data associated with a first hemisphere of a radial plot; and
 a surface control system comprising:
  a surface transceiver configured to receive the first subset of the measurement data associated with the first hemisphere; and
  a surface controller configured to mirror the first subset of the measurement data associated with the first hemisphere to represent a second subset of the measurement data associated with a second hemisphere of the radial plot, and to generate an image log using the first subset of the measurement data and the represented second subset of the measurement data.

9. The drilling rig apparatus of claim 8, wherein the bottom hole assembly further comprises:
 a processor configured to arrange the measurement data into the first subset of the measurement data associated with the first hemisphere and the second subset of the measurement data associated with the second hemisphere.

10. The drilling rig apparatus of claim 9, wherein:
 the processor is further configured to average values of the first subset of the measurement data with respective values of the second subset of the measurement data into an average values subset of the measurement data, and
 the bottom hole assembly transceiver is further configured to transmit the average values subset of the measurement data as the second subset of the measurement data.

11. The drilling rig apparatus of claim 10, wherein:
 the radial plot comprises 16 total bins spaced around the radial plot numbered 0 to 15, with bins 0 and 15 located at a top portion of the radial plot and bins 7 and 8 located at a bottom portion of the radial plot, and
 the processor is further configured, for the averaging, to average bins 0 and 15 together, bins 1 and 14 together, bins 2 and 13 together, bins 3 and 12 together, bins 4 and 11 together, bins 5 and 10 together, bins 6 and 9 together, and bins 7 and 8 together to constitute the average values subset of the measurement data.

12. The drilling rig apparatus of claim 8, wherein:
 the first subset of the plurality of measurement data comprises an up value corresponding to an upper portion of the radial plot, a down value corresponding to a lower portion of the radial plot, and a left value corresponding to a left portion of the radial plot, and
 the surface controller is configured to copy the left value as a right value corresponding to a right portion of the radial plot.

13. The drilling rig apparatus of claim 8, wherein the sensor comprises a gamma imaging sensor.

14. The drilling rig apparatus of claim 8, wherein the sensor comprises a density imaging sensor.

15. A method, comprising:
 detecting, by a sensor of a bottom hole assembly in a wellbore, a plurality of measurement data comprising approximately 360 degrees of the wellbore while the bottom hole assembly is in the wellbore;
 sorting, by the bottom hole assembly, the plurality of measurement data into a radial plot having a first hemisphere with a first subset of the plurality of measurement data and a second hemisphere with a second subset of the plurality of measurement data; and transmitting, from the bottom hole assembly, the first subset of the plurality of measurement data to a surface controller configured to mirror the first subset of the plurality of measurement data to represent the second subset of the plurality of measurement data for the second hemisphere for image log generation.

16. The method of claim 15, further comprising:

averaging, by the bottom hole assembly, values of the first subset of the measurement data with respective values of the second subset of the measurement data into an average values subset of the measurement data, wherein the transmitting further comprises transmitting the average values subset of the measurement data as the first subset of the measurement data.

17. The method of claim 16, wherein the radial plot comprises 16 total bins numbered 0 to 15, the averaging further comprising:

averaging, by the bottom hole assembly, bins 0 and 15 together, bins 1 and 14 together, bins 2 and 13 together, bins 3 and 12 together, bins 4 and 11 together, bins 5 and 10 together, bins 6 and 9 together, and bins 7 and 8 together to constitute the average values subset of the measurement data, wherein bins 0 and 15 are located at a top portion of the radial plot and bins 7 and 8 are located at a bottom portion of the radial plot.

18. The method of claim 16, wherein the radial plot comprises 8 total bins numbered 0 to 7, the averaging further comprising:

averaging, by the bottom hole assembly, bins 0 and 7 together, bins 1 and 6 together, bins 2 and 5 together, and bins 3 and 4 together to constitute the average values subset of the measurement data, wherein bins 0 and 7 are located at a top portion of the radial plot and bins 3 and 4 are located at a bottom portion of the radial plot.

19. The method of claim 15, further comprising:

compressing, by the bottom hole assembly, the first subset of the measurement data prior transmitting the first subset of the measurement data to the surface controller.

20. The method of claim 15, wherein:

the sorting further comprises sorting the first subset of the measurement data into an up value corresponding to an upper portion of the radial plot, a down value corresponding to a lower portion of the radial plot, and a left value corresponding to a left portion of the radial plot, and the surface controller is configured to mirror the first subset of the measurement data by copying the left value as a right value corresponding to a right portion of the radial plot.

* * * * *

UNITED STATES PATENT AND TRADEMARK OFFICE
CERTIFICATE OF CORRECTION

| | | |
|---|---|---|
| PATENT NO. | : 9,995,840 B1 | Page 1 of 1 |
| APPLICATION NO. | : 15/489256 | |
| DATED | : June 12, 2018 | |
| INVENTOR(S) | : Christopher Viens | |

It is certified that error appears in the above-identified patent and that said Letters Patent is hereby corrected as shown below:

On the Title Page

In the Title and in the Specification, In Column 1, Line 1:
Please replace "Minor" with --Mirror--.

Signed and Sealed this
Fourth Day of June, 2019

Andrei Iancu
*Director of the United States Patent and Trademark Office*